United States Patent [19]

Le Gars

[11] Patent Number: 5,053,929

[45] Date of Patent: Oct. 1, 1991

[54] DEVICE FOR ILLUMINATING A BUNDLE OF OPTICAL FIBERS

[75] Inventor: Jacques Le Gars, Gambais, France

[73] Assignee: Societe d'Etudes pour le Developpement des Productions Electroniques, Plaisir Cedix, France

[21] Appl. No.: 507,847

[22] Filed: Apr. 12, 1990

[30] Foreign Application Priority Data

Apr. 20, 1989 [FR] France .................. 89 05253

[51] Int. Cl.⁵ .............................. F21V 7/04
[52] U.S. Cl. ............................ 362/32; 362/20; 362/276; 362/802; 385/31; 385/901
[58] Field of Search ............ 362/20, 32, 234, 238, 362/241, 252, 276, 253, 802; 350/96.18, 96.24

[56] References Cited

U.S. PATENT DOCUMENTS

| 3,683,167 | 8/1972 | Rishton | 350/96.1 |
| 4,048,486 | 9/1977 | Kriege | 362/32 |
| 4,461,974 | 7/1984 | Chiu | 362/12 X |

FOREIGN PATENT DOCUMENTS

| 0302737 | 2/1989 | European Pat. Off. | |
| 1901122 | 8/1970 | Fed. Rep. of Germany | 362/32 |
| 2533017 | 9/1982 | France | |
| 2041187 | 2/1979 | United Kingdom | |

Primary Examiner—Stephen F. Husar
Attorney, Agent, or Firm—Fidelman & Wolffe

[57] ABSTRACT

In a device for illuminating a bundle of optical fibers the ends of which are grouped together in a sleeve a device is provided for monitoring the operation of each lamp. The device supples an alarm in response to any deficiency of the corresponding lamp.

5 Claims, 2 Drawing Sheets

DEVICE FOR ILLUMINATING A BUNDLE OF OPTICAL FIBERS

BACKGROUND OF THE INVENTION

1. Field of the Invention

The present invention concerns a light source for illuminating all the optical fibers in a bundle of optical fibers. A device of this kind is placed at the entry end of the bundle and the light received by each optical fiber is transmitted to its exit end. The bundle of optical fibers may be used for display purposes, for example.

For the light to enter each of the optical fibers it must be at a small angle of incidence to the axis of the fiber; also, it is necessary for all the fibers to be lit uniformly so that they transmit substantially the same quantity of light.

2. Description of the Prior Art

When it is necessary to illuminate a bundle of optical fibers comprising a large number of fibers it is necessary, if good results are to be obtained, to divide the bundle into multiple groups of fibers which are assembled together in a sleeve to constitute a harness, as described in the document U.S. Pat. No. 3.683.167, each sleeve being illuminated by an electric lamp. To illuminate a bundle of 400 optical fibers, for example, the fibers are divided into two sets of 200 fibers which are assembled into a half-harness, each of the sets being illuminated by a separate electric lamp as described in the document GB-2.041.187.

This device is somewhat complex as it requires the bundles to be divided into several parts each comprising a sleeve and an associated lamp. Also, the reliability of this device is very poor since should a lamp fail the corresponding half-bundle is no longer illuminated; finally, the electrical power consumption is relatively high as two relatively high power (50 W) lamps are used.

Furthermore, the lack of homogeneity in the lamp affects the beam that it emits with the result that the light applied to the set of optical fibers is not homogeneously distributed.

An object of the present invention is a device for illuminating a bundle of optical fibers which enables the fibers to be illuminated homogeneously, which has improved reliability and which is of reduced cost.

SUMMARY OF THE INVENTION

The illumination device in accordance with the present invention comprises at least three low-power, narrow-beam electric lamps disposed around the axis of the sleeve in a regular distribution and with an angle of incidence of not more than 10°.

The use of narrow-beam lamps at a relatively large distance from the sleeve results in good efficiency, the light injected into the fibers being only slightly attenuated because of the low value of the angle of incidence.

The invention also makes it possible to inject light into all of the optical fiber bundle without it being necessary to divide it into two, which reduces the overall size and the cost of the device.

The use of multiple lamps obviously increases the reliability of the system as the probability that all the lamps will fail is very low. Additionally, the electrical power consumption is reduced; instead of using two 50 W lamps each to illuminate one half-bundle it is possible to use just three 15 W lamps.

The use of a plurality of regularly distributed lamps make it possible to eliminate defects due to the lack of homogeneity of the lamps.

Likewise, the use of a plurality of lamps makes it possible to increase significantly the reliability because in a device with three lamps, should one lamp fail the loss of illumination is only 33%, which means that the fiber bundles can continue to operate correctly.

In a first embodiment of the invention a device is provided to monitor the operation of the lamps and output an alarm in the case of any deficiency of the lamps so that the deficient lamp can be replaced without interrupting the operation of the light source.

In another embodiment only two of the three lamps are on and the third lamps serves as a back-up which is turned on automatically in response to failure of either of the others.

In a further embodiment of the invention three-color illumination is achieved by placing a colored filter in front of each lamp.

Other characteristics and advantages of the invention will emerge from the following description and the appended drawings.

DETAILED DESCRIPTION OF THE INVENTION

Figure 1:
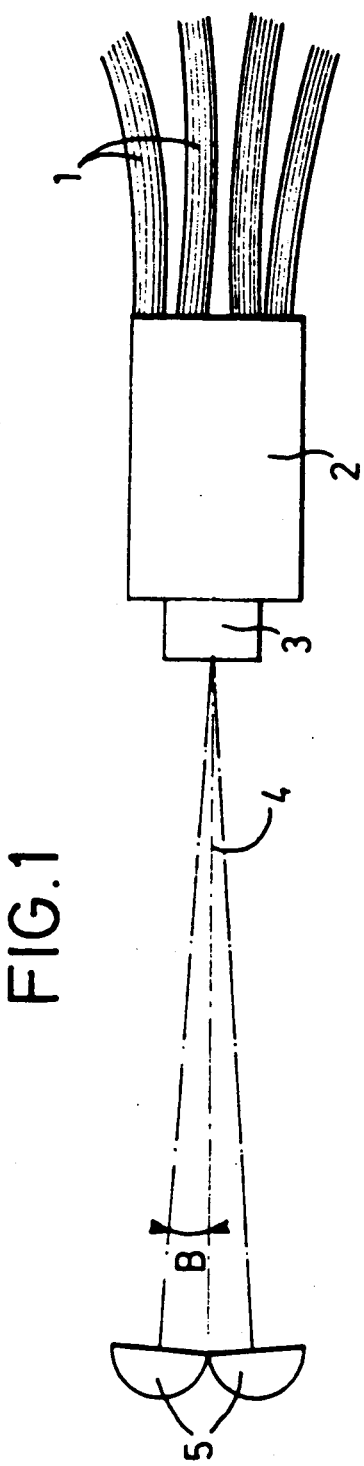
FIG. 1 is a side view of one embodiment of the invention.

There is seen in FIG. 1 a bundle of optical fibers divided between a plurality of sheaths 1 and the ends of which are grouped together in a sleeve 2 which has an end-piece 3 in which the ends of the optical fibers are accommodated. In the case of a display device the number of optical fibers may be relatively high (several hundred, for example) and the fibers must be homogeneously illuminated so that each fiber transmits approximately the same amount of light.

Figure 2:
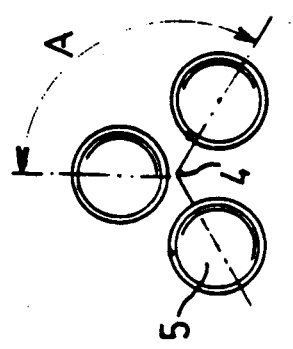
FIG. 2 is a front view showing the distribution of the lamps.

In accordance with the invention the end-piece 3 of the sleeve or harness 2 is illuminated by a plurality of (at least three) electric lamps which are distributed regularly around the axis 4 of said sleeve. In the example shown three lamps 5 are used and, as can be seen in FIG. 2, they are disposed regularly around the axis 4 of the sleeve 2; in this case the angular distance A between the axes of two adjacent lamps is 120°. The three lamps 5 are narrow-beam lamps and the light from them can therefore be concentrated onto the end-piece 3 of the sleeve 2, the distance between the lamps and the sleeve 3 being determined so that the angle of incidence B for each lamp is not greater than 10°. This secures sufficient illumination of the end-piece 3 to enable use of a single sleeve or harness to illuminate a large number of optical fibers. For example, using three narrow-beam 15 W lamps provides sufficient illumination for a set of 400 optical fibers with their ends grouped in a single sleeve or harness.

The use of a plurality of lamps to illuminate the bundle of optical fibers makes it possible to compensate for lack of homogeneity in the beam provided by each lamp.

Figure 3:
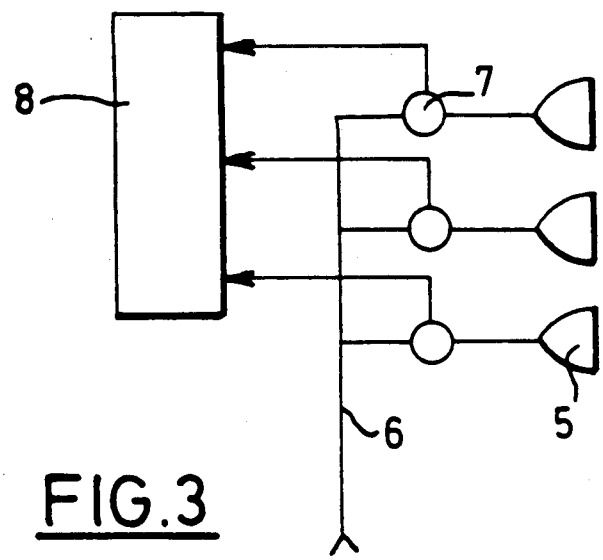
FIGS. 3 and 4 show two ways of using the invention.

FIG. 3 shows a first application of the invention which enables improved maintenance of an optical fiber bu... illumination device of this kind. As can be seen in FIG. 3, each lamp 5 is supplied with power by a power supply line 6 and there is provided for each lamp a device for monitoring that it is operating correctly such as a current detector 7 connected in series with the power supply to the lamp. The information supplied by each monitoring device 7 is transmitted to an alarm device 8 which generates an alarm signal as soon as any lamp 5 stops working. The bundle of optical fibers then receives only two thirds of the original illumination but this loss of illumination nevertheless allows the apparatus using the various optical fibers to operate normally. The alarm provided by the device 8 alerts the maintenance personnel who can immediately replace the defective lamp without interrupting service of the apparatus using the optical fibers.

Figure 4:
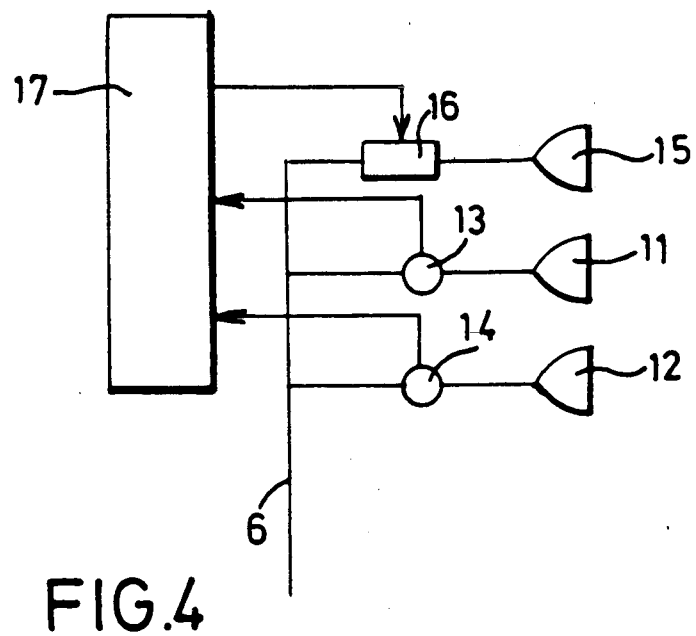

In another embodiment shown in FIG. 4 two lamps 11 and 12 comprise a respective monitor detector 13 and 14 in their power supply line and the third lamp 15 constitutes a back-up lamp controlled by a switch 16 in its power supply circuit. A control device 17 receives the signal from the detectors 13 and 14 and controls the switch 16. In this case one lamp is a back-up lamp for the other two lamps which are on permanently. If one of the detectors 13 or 14 indicates failure of one of the normal lamps the control apparatus 17 commands closing of the switch 16 and supplies an alarm signal.

This method also means that service is uninterrupted and the back-up lamp 16 replaces the failed normal lamp until the latter can be changed. In this case the illumination of the optical fiber bundle remains substantially the same.

Another application of the invention entails placing a colored filter 18 in front of each lamp which enables three-color illumination in the case of a device with three lamps.

There is claimed:

1. An illuminating assembly for illuminating a bundle of optical fibers each having an end, comprising a sleeve having a longitudinal axis and an end-piece wherein the ends of the optical fibers are grouped together, at least three low-power, narrow-beam electric lamps disposed facing the end-piece of the sleeve and regularly distributed about the longitudinal axis of the sleeve so as to illuminate the ends of the optical fibers, wherein said low-power, narrow-beam electric lamps are sufficiently distanced from the end-piece of the sleeve so as to provide light beams concentrated onto the end-piece of the sleeve with an incidence angle between each light beam and the longitudinal axis of the sleeve of not greater than 10°.

2. The illuminating assembly according to claim 1, further comprising current detector means connected in series with a power supply of the electric lamps for detecting a current change reflective of a deficiency in operation of each lamp, and alarm means responsive to the current detector means for activating an alarm when a deficiency is detected.

3. The illuminating assembly according to claim 1, further comprising switch means connected between one of the electric lamps and the power supply, wherein said one electric lamp is a back-up lamp and said switch means is controlled by the alarm means so as to activate said back-up lamp when a deficiency is detected.

4. The illuminating assembly according to claim 1, further comprising color-filter means disposed in front of each electric lamp for providing three-color illumination.

5. The illuminating assembly according to claim 2, further comprising color-filter means disposed in front of each electric lamp for providing three-color illumination.

* * * * *